United States Patent [19]
Grossenbacher et al.

[11] Patent Number: 5,727,653
[45] Date of Patent: Mar. 17, 1998

[54] DRIVE DEVICE FOR AN ACTUATOR

[75] Inventors: Christian Grossenbacher, Waltenschwil; Werner Studer, Oberageri, both of Switzerland

[73] Assignee: Landis & Gyr Technology Innovation AG, Switzerland

[21] Appl. No.: 614,504

[22] Filed: Mar. 13, 1996

[30] Foreign Application Priority Data

Apr. 11, 1995 [CH] Switzerland .................... 1050/95

[51] Int. Cl.⁶ .................... F03G 1/08; F24F 13/08
[52] U.S. Cl. .................... 185/40 R; 251/69; 251/129.11
[58] Field of Search .................... 185/40 R; 251/69, 251/71, 129.11

[56] References Cited

U.S. PATENT DOCUMENTS

| | | | |
|---|---|---|---|
| 4,273,307 | 6/1981 | Malinski et al. | 251/69 |
| 4,581,987 | 4/1986 | Ulicny | 185/40 R X |
| 4,595,081 | 6/1986 | Parsons | 185/40 R |
| 4,621,789 | 11/1986 | Fukamachi | 185/40 R X |
| 5,205,534 | 4/1993 | Giordani | 251/129.11 |
| 5,310,021 | 5/1994 | Hightower | 185/40 R |
| 5,518,462 | 5/1996 | Yach | 251/129.11 X |

FOREIGN PATENT DOCUMENTS

| | | |
|---|---|---|
| 8809088 | 11/1988 | Germany. |
| 9211628 | 2/1993 | Germany. |
| 4320073 | 12/1994 | Germany. |

Primary Examiner—Charles A. Marmor
Assistant Examiner—Troy Grabow
Attorney, Agent, or Firm—Greer, Burns & Crain, Ltd.

[57] ABSTRACT

A drive device for controlling the position of an actuator includes an electric motor for actuating the drive device. The motor is coupled to a gear mechanism and adapted to control the position of the actuator by selective operation thereof. A gear mechanism operatively coupled to the motor and to the actuator has a restoring spring and an auxiliary spring, each of which is tightenable to store energy therein by operation of the motor upon startup. In the event of a power loss to the motor, the gear mechanism operates to use the stored energy of the restoring spring to move the actuator to a preselected position. The stored energy of the auxiliary spring is used to counteract against moment of the motor at rest.

2 Claims, 1 Drawing Sheet

DRIVE DEVICE FOR AN ACTUATOR

The invention generally relates to a drive device for controlling the position of an actuator, and more particularly relates to a motorized drive device that has a restoring function which resets the actuator in a preferred position in the event of power failure of the drive device.

Such drive devices are used advantageously, in heating, ventilating and air-conditioning installations for the actuation of actuators such as valves or dampers and the like. Through a restoring function, the drive device positions an actuator in a predetermined position if power to the motor is lost. The restoring function serves to avoid frost damage or to limit the danger to a local area, for example, in fires or other disturbances.

The prior development of Landis & Gyr included an electric-motor operated drive device for an actuator, which device had an asynchronous motor, a restoring spring, a coupling and a gear unit. Upon starting, the asynchronous motor tensions the restored spring, which on power failure restores the actuator to a predetermined position. When such a power loss occurs, the restoring spring had to provide sufficient torque for actuating the actuator, it being necessary, moreover, to overcome with certainty any resistance provided by the motor and the gear unit.

One of the undesirable attributes of the prior design was that the restoring spring had to provide a relatively high torque.

Accordingly, it is a primary object to provide an improved highly dependable driving device for an actuator which has a restoring function, including a restoring spring of relatively low torque, which is economical to produce.

Other objects and advantages will become apparent from the following detailed description, while referring to the attached drawings, in which.

DETAILED DESCRIPTION

Figure 1:
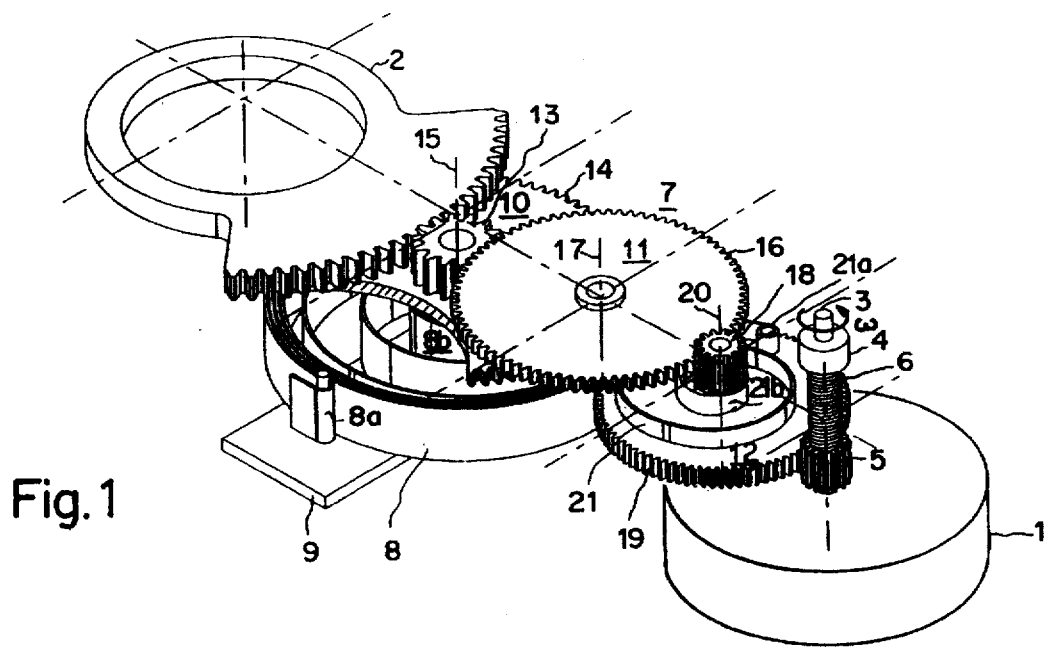
FIG. 1 is a perspective view of an embodiment of the present invention illustrating a drive device with a restoring spring and an auxiliary spring.

Referring to the drawings, and particularly FIG. 1, a motor 1 is shown for actuating a set wheel 2 that is operably coupled with an adjusting means (not shown). A drive axle 3 of the motor 1 has an entrainment device 4. A gear wheel 5 rotatably arranged concentrically on the drive axle 3 is operatively coupled with the entrainment device 4 and therefore with the drive axle 3 via a free-wheeling coupling 6. The gear wheel 5 is driven by the motor 1 and is coupled via a gear mechanism 7 with a restoring spring 8 and also with the set wheel 2. The restoring spring 8 can be tensioned by the motor 1 via the gear mechanism 7. For this purpose, a first end 8a of the restoring spring 8 is connected with a housing part 9, while a second end 8b of the restoring spring 8 is connected to a gear wheel 10 of the gear mechanism 7.

The gear mechanism 7 in the embodiment of FIG. 1 comprises the gear wheel 10 which is a double wheel, a second double wheel 11 and a third double wheel 12 as shown in FIG. 1.

The gear wheel 10 has a first pinion 13 and a first wheel 14, the first pinion 13 and the first wheel 14 being arranged on a common rotation axis 15 and rigidly coupled with one another. The second double wheel 11 has a second pinion (not shown) and a second wheel 16, the second pinion and the second wheel 16 being arranged on a common rotation axis 17 and rigidly coupled with one another.

The third double wheel 12 advantageously has a third pinion 18 and a third wheel 19, the third pinion 18 and the third wheel 19 being rotatable with respect to one another on a common rotation axis 20. Advantageously, the third pinion 18 and the third wheel 19 are coupled with one another via an auxiliary spring 21. For this purpose, a first end 21a of the auxiliary spring 21 is connected to the third wheel 19, while a second end 21b of the auxiliary spring 21 is connected to the third pinion 18.

The set wheel 2 has a toothed outer portion which is engaged with the first pinion 13, while the first wheel 14 is engaged with the second pinion of the second, double wheel 11, the second wheel 16 of which is engaged with the third pinion 18 and the third wheel 19 with the gear wheel 5.

The gear mechanism 7 can be laid out in a known manner for the torques and turning speeds to be transferred.

By operation of the flee-wheeling coupling 6, damage to the gear mechanism 7 and to the gear wheel 5 are prevented during operation of the restoring function drive, which is powered by the restoring spring 8. Upon power loss, when the setting element attached to the set wheel 2 reaches its predetermined position, the rotating inertia mass of the motor 1 is capable of running out over the flee-wheeling coupling 6 to a standstill, without imparting harmful effects to the gear mechanism 7 or the gear wheel 5.

Basically, the auxiliary spring 21 has a lower spring torque than the restoring spring 8. Advantageously, the spring torque $M_H$ of the tightened auxiliary spring 21 is sufficient to reliably overcome at least the rest moment $M_{Mr}$ of the switched-off motor 1.

If the motor 1 is, for example, a certain direct current motor, the value of the rest moment $M_{Mr}$ evoked by permanent magnets of the motor 1 runs approximately sinusoidally, in which case the rest moment depends, in a known manner, on the pole pair number p of the motor 1 and the angle of rotation ω of the drive axle 3.

By a turning of the gear wheel 5 driven by the motor 1 the relaxed auxiliary spring 21 is tightenable until a torque is transferrable from the gear wheel 5 to the second double wheel 11 and further, via the gear wheel 10, to the set wheel 2. In the embodiment of FIG. 1, the relaxed auxiliary spring 21 is tightenable as the gear wheel 5 is turned counterclockwise as shown. With auxiliary spring 21 tightened, the restoring spring 8 is then tightenable by the motor 1, the set wheel 2 being actuatable by the motor 1.

Figure 2:
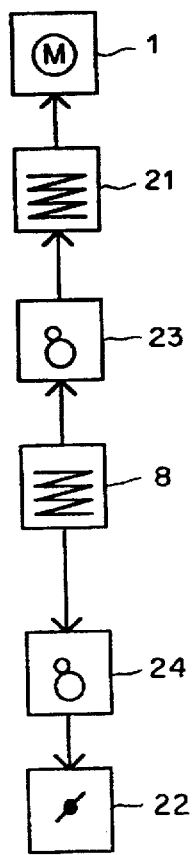
FIG. 2 is a block diagram of a theoretical construction of the drive device; and, FIG. 3 an alternative embodiment of an auxiliary spring of the drive device.

In FIG. 2, the drive device embodying the present invention has the motor 1, the auxiliary spring 21 and the restoring spring 8 for a setting element (actuator) 22 are still schematically represented as a functional block diagram. A first gear stage 23 active between the auxiliary spring 21 and the restoring spring 8 and a second gear stage 24 active between the restoring spring 8 and the setting element 22 are realized in the embodiment according to FIG. 1 by the gear mechanism 7 or, respectively, by the gear mechanism 7 and the set wheel 2.

In normal operation of the drive device, i.e., when the setting element is operated by the motor 1 according to a regulating or a control action, the auxiliary spring 21 and the restoring spring 8 are tensioned. A dropping out of the drive moment of the motor 1 occurring on a power failure triggers an automatic restoring function of the drive device, after which the spring torque or the spring energy of the tensioned restoring spring acts, on the one hand, over the second gear stage 24 on the setting element 22 and, on the other hand, over the first gear stage 23 and the tensioned auxiliary spring 21 against the motor 1, which is represented in FIG. 2 by the direction of arrows between the function blocks. In the execution of the automatic restoring function, a setting movement on the setting element 22 is practicable only after an overcoming of all the moments counteracting the restoring function. Advantageously, the rest moment $M_{Mr}$ of the switched-off motor 1 counteracting the restoring function is surely overcome by the tensioned auxiliary spring 21, so that the setting element 22 is resettable by the restoring spring 8 over the second gear stage 24 into the position provided on power failure.

Advantageously, the auxiliary spring 21 is dimensionable so that the rest moment $M_{Mr}$ of the switched-off motor 1 and also a possibly acting adherence or friction torque of gear wheels 19 and 5 lying between the auxiliary spring 21 and the drive axle 3 of th motor 1 (FIG. 1) can be overcome by the tensioned auxiliary spring 21.

Figure 3:
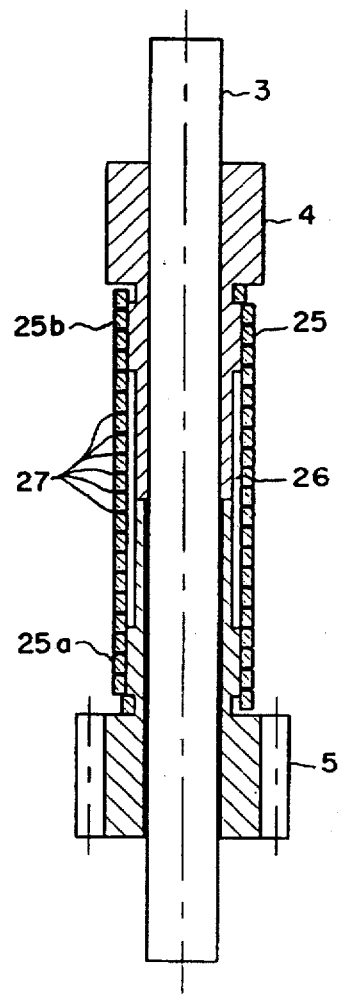

In an advantageous alternative embodiment, the described functions of the auxiliary spring 21 and of the flee-wheeling coupling 6 are combinable by means of a loop spring (Schlingfeder) 25 in FIG. 3. FIG. 3 also shows the drive axle 3 shown in FIG. 1, as well as the entrainment device 4 and the gear wheel 5, which in the embodiment of FIG. 3 is rigidly coupled with the second double wheel 11 (FIG. 1). The entrainment device 4 is firmly attached to the drive axle 3, while the gear wheel 5 is rotatable relative to the drive axle 3. The gear wheel 5 is coupled with the entrainment device 4 via the loop spring 25, a connection thus being formed of the loop spring 25 to the gear wheel 5 or the entrainment device 4, so that the inert mass of the motor 1 rotating in the execution of the restoring function-as in the case of the free-wheeling coupling 6 according to FIG. 1—is capable of running out to a standstill, without producing harmful effects on the gear mechanism 7 (FIG. 1) or on the gear wheel 5. Advantageously at least one of the two connections of the loop spring 25 with the gear wheel 5 and with the entrainment device 4, respectively, is realized by spirally wound encirclings 25a and/or 25b of the loop spring 25 about a slightly enlarged diameter hub of the gear wheel 5 or about the entrainment device 4.

Advantageously, there is a free space 26 between the hubs and the loop spring 25, which is formed coaxially to the drive axle 3. The loop spring 25 is advantageously wound in the zone of the free space 26 so that when the loop spring 25 is relaxed, turn-spacings 27 are formed between the individual spring turns. By the turn spacings 27 and the free space 26 the loop spring 25 is tightenable by the motor 1, in which process turns of the tensioned loop spring 25 partly fill the free space 26.

As applied to the drive axle 3, the loop spring 25 basically has a lesser spring torque than the restoring spring 8. Advantageously, the spring torque $M_H$ of the loop spring 25 is sufficiently large that at least the rest moment $M_{Mr}$ of the motor 1 with switched-off motor feed can reliably be overcome by the tightened loop spring 25.

As the entrainment device 4 is turned by the motor 1, the relaxed loop spring 25 is gradually tightened until a torque is transferred from the gear wheel 5 to the second double wheel 11, and further, via the gear wheel 10, to the set wheel 2. With a tightened loop spring 25, the restoring spring 8 is then tightened by the motor, in which case the set wheel 2 is also actuatable by the motor 1.

A further advantage of the drive device of the invention lies in the fact that the inert mass of the motor 1, when brought into a rotary movement by the auxiliary spring 21 or the loop spring 25, overcomes the adhesive friction moment of the gear mechanism 7 and an adhesion effect arising after a relatively long standstill of the drive device in the gear mechanism 7, whereby the dependability of the restoring function is substantially improved.

The advantageous efficiency of the drive device attainable with the auxiliary spring 21 (FIG. 1) or with the loop spring 25 (FIG. 3) is to be explained once again with the aid of the following much-simplified numerical example:

With reference to the drive axle 3, assume that a torque $M_{Last}=6$ mNm is necessary to actuate the set wheel 2; and that the tensioned restoring spring 8 has a spring torque $M_R=10$ mNm. Also, assume the rest moment $M_{Mr}$ of the motor 1 running, (sinusoidally in dependence on the angle of rotation ω) has a maximal value $M_{Mr*}=5$ mNm. In a known drive device, i.e., without either the auxiliary spring 21 or the loop spring 25, the restoring spring 8, for the execution of the restoring function, would have to exceed the moment $M_{Last}=6$ mNm and would also have to overcome at least the rest moment $M_{Mr}$ of the switched-off motor 1. For the overcoming of the rest moment $M_{Mr}$ there remains a difference moment $$M_\Delta = M_R - M_{Last(load)} = 10 \text{ mNm} - 6 \text{ mNm} = 4 \text{ mNm}.$$

In this situation, the difference moment $M_\Delta$ is less than the maximal value $M_{Mr*}$, and the execution of the restoring function is therefore not ensured with certainty.

In the drive device according to the present invention, the tensioned auxiliary spring 21 or loop spring 25 has, for example, the spring torque $M_H=6$ mNm. Proceeding from a state of the drive device in which the auxiliary spring 21 or loop spring 25 is relaxed and the motor 1 is started, in a first step the auxiliary spring 21 or loop spring 25 is tensioned to the spring torque $M_H=6$ mNm and in a second step, when the motor 1 produces the drive moment $M_M > M_R + M_{Last} = 10$ mNm + 6 mNm = 16 mNm, it moves the set wheel 2 and the restoring spring 8. In the releasing of the restoring function energy, the maximal value $M_{Mr*}=5$ mNm of the rest moment $M_{Mr}$ is surely overcome by the auxiliary spring 21 or by the loop spring 25 tensioned with the spring torque $M_H=6$ mNm, whereby the restoring function is reliably executed.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A drive device for controlling the position of an actuator comprising:
    an electric motor for actuating the drive device,
    said motor being adapted to control the position of the actuator by selective operation of the motor;
    a gear mechanism having a first end operatively coupled to and adjacent said motor and a second end operatively coupled to and adjacent said actuator;
    restoring spring means, operatively connected to said gear mechanism adjacent said second end, for storing energy from operation of said motor; and
    auxiliary spring means, operatively connected to said gear mechanism adjacent said first end, for storing energy from operation of said motor;

whereby in response to loss of power applied to said motor, said gear mechanism being operable to use said stored energy of said restoring spring means to move said actuator to a preselected position, and to use said stored energy of said auxiliary spring means to counteract against the moment of said motor at rest.

2. A drive device according to claim 1 wherein said motor is coupled to a gear wheel, an entrainment device is coupled with said gear wheel and said auxiliary spring means is coupled with said entrainment device, and wherein a free space is defined by said auxiliary spring means when said auxillary spring means is relaxed, said free space being at least partly filled when said auxillary spring means is under tension.

* * * * *

UNITED STATES PATENT AND TRADEMARK OFFICE
CERTIFICATE OF CORRECTION

PATENT NO. : 5,727,653
DATED : March 17, 1998
INVENTOR(S) : Grossenbacher et al.

It is certified that error appears in the above-identified patent and that said Letters Patent is hereby corrected as shown below:

Column 2, line 26, delete "flee-wheeling" and insert --free-wheeling-- therefor

Column 3, line 18, delete "th" and insert --the-- therefor

Column 4, line 36, delete "$M_M > M_R$" and insert --$M_M \geq M_R$-- therefor

Signed and Sealed this

Eighth Day of September, 1998

Attest:

BRUCE LEHMAN

Attesting Officer     Commissioner of Patents and Trademarks